United States Patent [19]
Irvine

[11] 3,986,574
[45] Oct. 19, 1976

[54] AIR INTAKE DUCT AND TOOL BOX COMBINED

[75] Inventor: Gerald O. Irvine, Crosby, Minn.

[73] Assignee: Scorpion, Inc., Crosby, Minn.

[22] Filed: May 23, 1975

[21] Appl. No.: 580,297

[52] U.S. Cl. .................. 180/54 A; 224/42.42 R; 180/69 R
[51] Int. Cl.² ........................................ B60K 11/06
[58] Field of Search ............... 180/5 R, 54 A, 69 R; 224/42.42 R

[56] References Cited
UNITED STATES PATENTS

| | | | |
|---|---|---|---|
| 1,859,331 | 5/1932 | Heaslet | 180/69 R |
| 2,005,285 | 6/1935 | Woody | 224/42.42 R |
| 3,819,000 | 6/1974 | Larsen | 180/54 A |

*Primary Examiner*—Philip Goodman
*Attorney, Agent, or Firm*—Dugger, Johnson & Westman

[57] ABSTRACT

A unitary, molded combined tool box and air intake duct for use in snowmobiles to save space, minimize expense, and provide for reducing the noise associated with the engine air intake as well as the storage of necessary tools.

7 Claims, 4 Drawing Figures

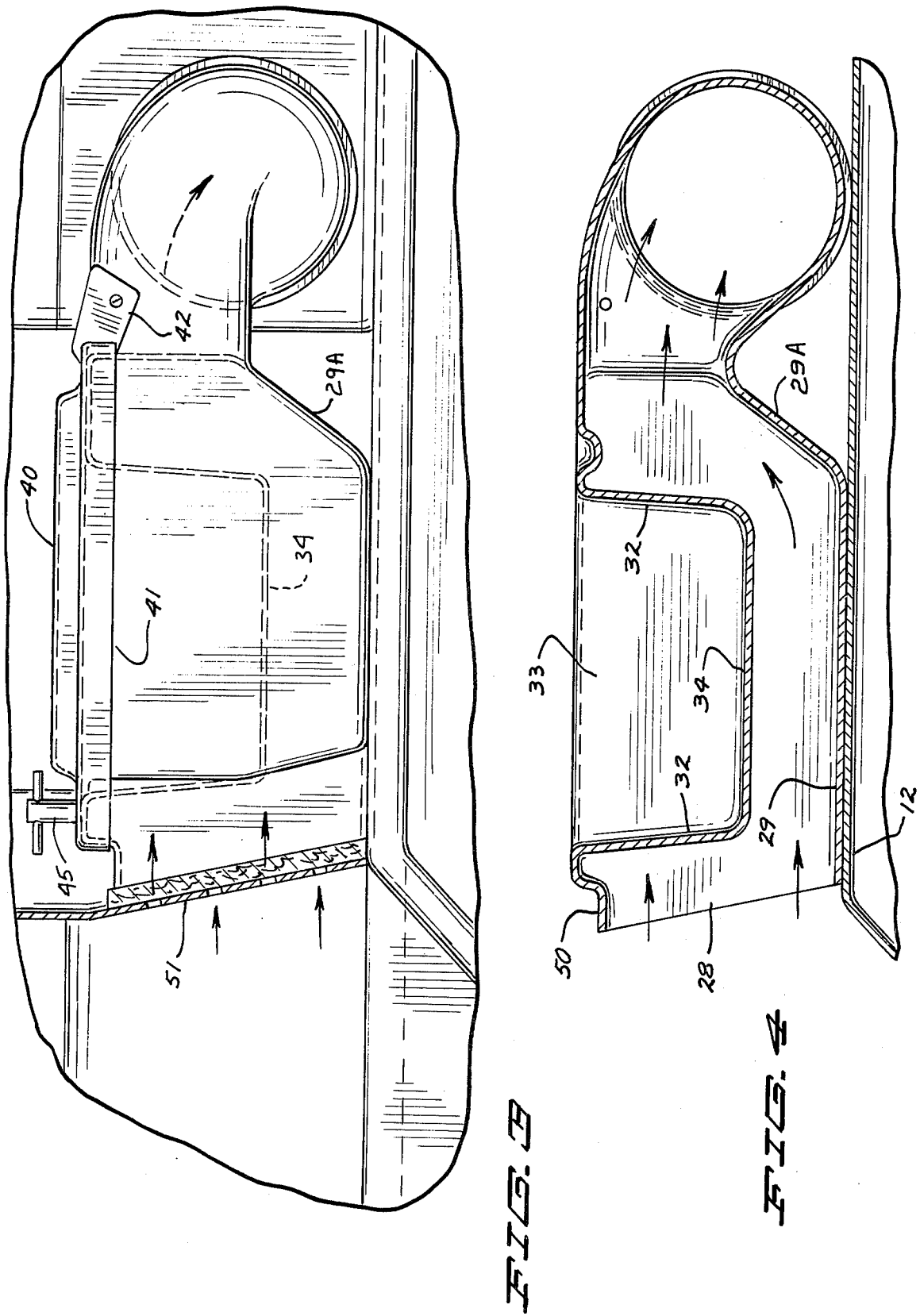

AIR INTAKE DUCT AND TOOL BOX COMBINED

BACKGROUND OF THE INVENTION

1. Field of the Invention

The present invention relates to snowmobile construction and in particular air intake ducts for such snowmobiles.

2. Prior Art

One of the problems in the manufacture of snowmobiles is cost. A second one is space. A third one is noise. Space is always limited on snowmobiles, and the costs always seem to be higher than they should be because of the noise problem and air intake ducts must be designed to be noise mufflers. It has also been found desirable to provide some means for carrying tools or other items on the snowmobile in a safe, secure manner, without taking unnecessary space, and at the same time insuring that the stored items will be secured against loss during rough rides.

The design of intake air ducts which act as noise reducing mufflers has resulted in odd shapes because of the necessity of causing the air to change direction. Also the bent and curved ducts are not attractive. By combining a tool box into the air duct, baffling is provided, the duct is more attractive and the tool box is secure and does not take valuable space that would be used for other items.

SUMMARY OF THE INVENTION

The present invention relates to a low cost, space-saving easily molded air intake duct that provides a baffled airflow path to reduce noise and incorporates a tool box that fits as a unitary structure with the molded or formed intake duct. The device is designed so that it takes up no substantial additional space, and because it protrudes into the normal cross-sectional area of the intake, the tool box serves to form noise reducing baffles. The space available is such that the air intake is not restricted by the presence of the tool box. Molding the tool box into the duct can be done without any substantial additional increase in cost over the normally used intake members, and with the addition of a relatively low cost molded cover, the unit makes a compact tool box for storage of essential tools, plus other items such as spare parts, refreshments, or anything else that is desired.

Easily molded accessory receptacles can be made for holding extra spark plug and a spark plug wrench. The entire arrangement is extremely low cost and compact.

BRIEF DESCRIPTION OF THE DRAWINGS

FIG. 3 is a fragmentary side elevational view of a portion of a snowmobile showing a typical installation of the device of FIG. 2; and FIG. 4 is a sectional view taken generally along line 4—4 of FIG. 2.

DESCRIPTION OF THE PREFERRED EMBODIMENTS

Figure 1:
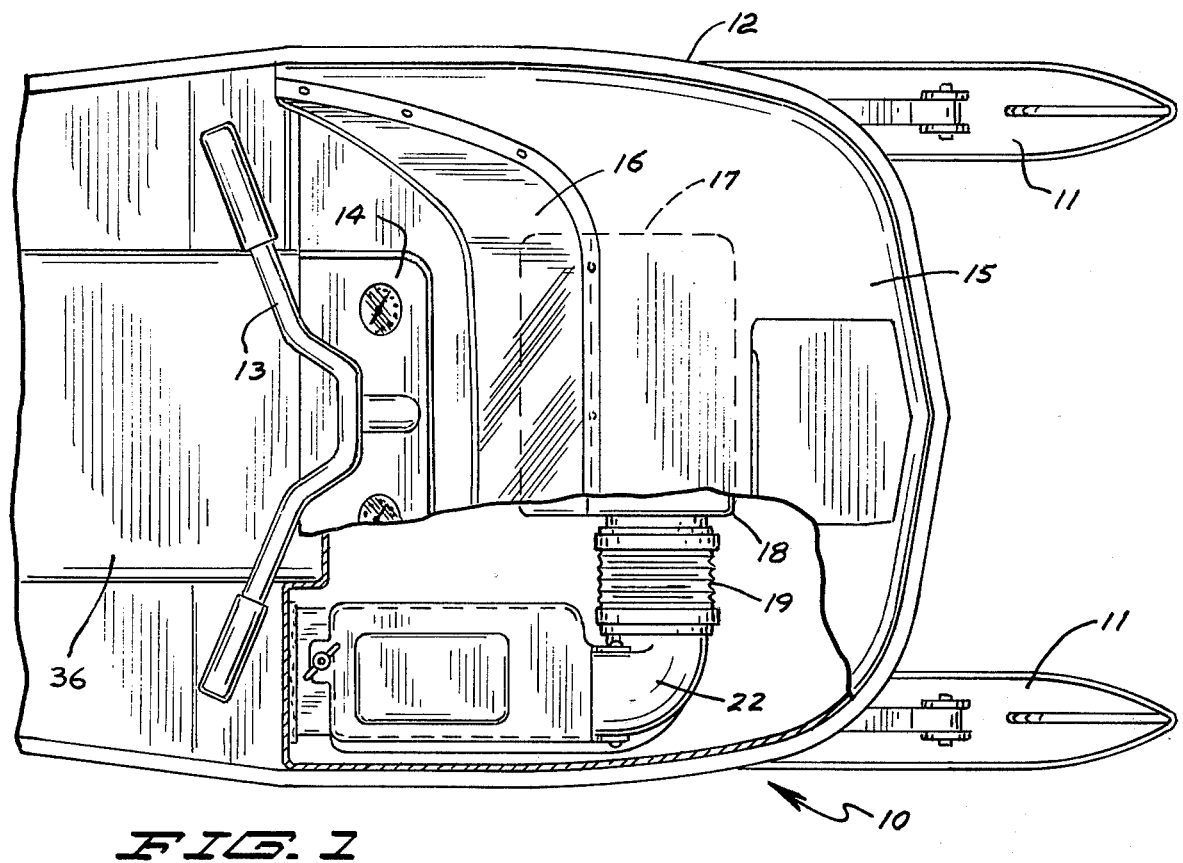
FIG. 1 is a fragmentary top plan view of the forward portion of a snowmobile with parts of the snowmobile broken away.

A snowmobile shown generally at 10 is of standard construction having front steering skis 11, mounted onto a chassis or frame 12, and which has handlebars 13 for steering the skis. An instrument cluster 14 is adjacent to the handlebars, and a hood member 15 that comprises an engine compartment cover, and also mounts the windshield 16 is mounted in a suitable manner with hinges to the forward portion of the chassis or frame 12. This hood member will lift up, and when it is lifted up the side portions of the machine on opposite sides of the instrument cluster will lift up with the hood member to expose the engine and parts below.

The engine 17, which is indicated schematically, is mounted in a suitable manner under the hood, and the engine has an air intake port or connection 18. This air intake port is a cooling air intake which provides for a flow of cooling air across an air-cooled engine.

The volume of air across the engine is controlled by the fan size and by the cross-sectional size of the intake port on the engine. Constriction of the cross-sectional area any place along the intake connection will constrict the airflow. Thus, it is important to have at least an area equal to the intake port of the engine in all places along the intake conduit.

The air intake port 18 as shown is connected through a flexible coupling 19 to a combined tool box and intake duct assembly 22 made according to the present invention. The assembly 22 is a unitary, molded pipe that has a first circular pipe portion 23 that is formed as an elbow, and a rearwardly extending main body portion 24. The duct may be molded from suitable plastic material. The transition area between the main body 24 and the pipe portion 23 can be molded and formed in a desirable manner to provide for smooth airflow between the two portions. As shown, the main body portion has a transverse width indicated generally by the arrows 25,25 which is greater than the diameter of the intake port 18, and also the main body has a substantial vertical depth, as shown in FIG. 4. This additional width can be accommodated because of the spacing between the center portion of the tunnel of the machine indicated generally at 26, and the side portions of the machine. Normally, when a conduit that is tubular and of circular cross section is placed in this location, there is some waste of space, but not enough extra space to accommodate a separate tool box.

The main body portion has a top wall 27, and vertical or uprightly extending side walls 28 that are spaced apart. The side walls 28 connect the top wall to a bottom duct wall 29 that is substantially planar, and rests along portions of the frame 12 of the snowmobile. The top wall 27, as shown, has a center cavity 31 defined therein, and the cavity is formed by end walls 32,32, side walls 33, and a bottom wall 34. The cavity has an open top when viewed in relation to the duct itself, but the walls 32, 33 and 34 form a receptacle isolated from the interior of the main body of substantial vertical and transverse depth. Air is permitted to pass or flow between the walls defining the receptacle and the walls form the main body portion 24.

Also as shown, the upper wall 27 may be provided with a molded receptacle 37 for a spark plug wrench, a transverse receptacle 38 that is shaped so that two spark plugs can be laid end to end in it and a receptacle 39 that can be used for the actuator lever for the spark plug wrench placed into the receptacle 37.

As shown perhaps best in FIG. 3, a cover member 40 which is also molded from suitable material is made to fit over the center portions of the body 24 and to cover the receptacles defined in the main body. As shown in FIG. 3, the center part of the top wall 27 is raised, and the cover 40 has a flange 41 that fits over the sides and ends of this raised portion. In addition, the cover 40 has a pair of molded integral ears 42 that are positioned on opposite sides of a transitional throat 43 leading to the curved pipe section 23. These ears 42 are pivotally mounted with suitable pins 43 to the transition section, so that the cover 40 can be raised and lowered about the axis of pins 43 to permit access to the cavity 31. A suitable lock 45 may be provided for securely fastening the cover in place with respect to the top wall 27.

Figure 2:
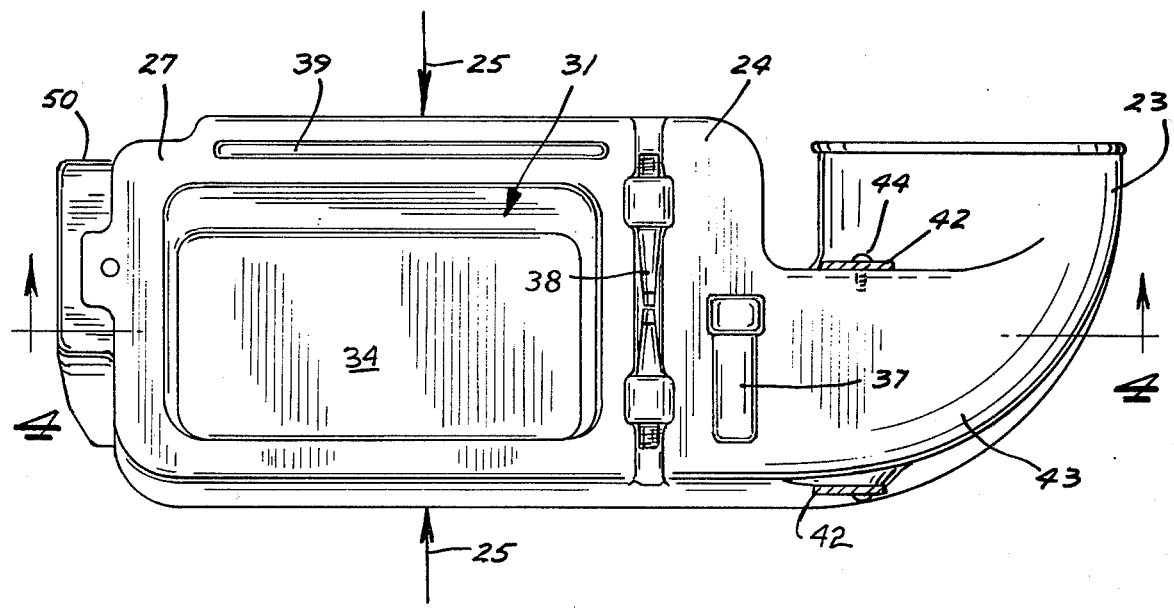
FIG. 2 is a top plan view of the combined air intake member and tool box make according to the present invention.

The end 50 of the main body portion 24 is open, and a grill member 51 can be used for covering this opening. The grill is positioned adjacent an operators foot support 51A that is alongside the forward end of the tunnel 26 which forms part of the frame. The opening provides the air intake for the duct, and the major portion of the air taken in will strike wall 32 and be deflected downwardly and sideways to flow around the tool box. This provides a change of direction for a substantial part of the incoming air to reduce the noise level. As the air reaches the transition throat 43 the bottom wall 29 is sloped upwardly as at 29A so the air flowing under the tool box must change direction. Note that wall portion 29A extends upwardly to a level above wall 34 of the tool box. Again noise is reduced. As shown in FIG. 2 the air flowing along the sides of the tool box walls also must change direction again before it flows through the intake part of the engine. Thus substantially all the intake air is caused to change direction at least once, utilizing the baffles formed by the tool box walls, to muffle the noise generated. The tool box walls also perform the second useful function of holding necessary tools, as well as serving as baffles.

The unit is easily molded, low cost, and combines the functions of providing a noise reducing muffler for intake airflow and a safe, secure tool box in the air intake duct for the engine without unduly complicating the construction, raising the cost, or taking additional space other than that which is already present on the snowmobile frame construction.

What is claimed is:

1. For use in combination with a snowmobile having an engine and an engine air intake on said engine, the improvement comprising an intake duct and tool box combination for carrying air to said engine air intake comprising a housing having outer walls defining a passageway, said housing having a main portion, an elbow section leading from said main portion of said housing to said engine air intake and being open to said passageway, connection means to connect said engine air intake to said elbow section, an upper wall of said housing having a receptacle defined therein and extending into the passageway, said receptacle being upwardly open and being defined by walls spaced from said outer walls on sides of said housing other than the upper wall, and cover means to cover said upwardly open receptacle.

2. For use in combination with a snowmobile having an engine and an engine air intake on said engine, the improvement comprising an air intake duct and tool box combination for carrying air to said air intake duct comprising a housing having outer walls defining a passageway, the uppermost of said walls having a receptacle defined therein and extending into the passageway, said receptacle being upwardly open and being defined by walls spaced from said outer walls on sides of said duct other than the upper side, wherein said housing has an outlet opening and a main body portion that is at substantially right angles to the axis of the outlet opening from said housing, said main body portion being of substantially greater cross-sectional area than said outlet opening, and said receptacle protruding into said main body portion, so that the passageways defined in the interior of said main body portion between said walls forming said receptacle and the walls forming said main body portion are of at least equal cross-sectional area to the area of the outlet opening, and cover means to cover said upwardly opening receptacle.

3. The combination as specified in claim 2 wherein said housing uppermost wall has additional receptacles molded therein for holding spark plugs and a spark plug wrench.

4. The combination as specified in claim 3 wherein said housing is a molded assembly made of a plastic material.

5. For use in combination with a snowmobile having a frame, an operator's area on the frame including foot supports, an engine, a cooling air intake for said engine, and means to mount said engine adjacent the forward end of said frame, the improvement comprising an air intake duct and tool box combination for carrying air to said air intake duct comprising a housing having outer walls defining a passageway, means to position said housing adjacent a lateral side of the engine, said passageway having an inlet adjacent a foot support of said snowmobile and having an outlet connected to the air intake, an upper one of said outer walls having a receptacle defined therein and extending into the passageway, said receptacle being upwardly open and being defined by receptacle walls spaced from said outer walls on sides of said housing other than the upper side, and cover means to cover said upwardly opening receptacle.

6. For use in combination with a snowmobile having an engine and an air intake on said engine, the improvement comprising an air intake duct and tool box combination for carrying air to said engine air intake duct comprising a housing having outer walls defining a passageway having an inlet opening adjacent one end thereof and an outlet connected to the engine air intake, the uppermost or said outer walls having a receptacle defined therein and extending into the passageway, said receptacle being upwardly open and being defined by receptacle walls spaced from said outer walls on sides of said housing other than the upper side, and said receptacle walls including a wall adjacent the inlet opening and forming a baffle to cause a change in direction of flow of a substantial portion of the air entering the inlet, and cover means to cover said upwardly opening receptacle.

7. The combination as specified in claim 6 wherein said walls defining said receptacle include walls cooperating with said housing to define an airflow path that changes direction at least one additional time between the wall forming a baffle and the air intake on said engine.

* * * * *